UNITED STATES PATENT OFFICE.

JAMES FOLEY, OF MONTREAL, CANADA.

IMPROVEMENT IN PROCESSES FOR TREATING TANNIN JUICES.

Specification forming part of Letters Patent No. 178,919, dated June 20, 1876; application filed March 29, 1876.

*To all whom it may concern:*

Be it known that I, JAMES FOLEY, of Montreal, in the Province of Quebec, Canada, have invented certain new and useful Improvements in the Treatment of Tannin Juices; and I do hereby declare that the following is a full, clear, and exact description thereof, which will enable others skilled in the art to which it pertains to make and use the same.

This invention has reference to the decolorization and preservation of tannin juices, aqueous tannin solutions, and concentrated tanning extracts obtained from hemlock or other barks, and other astringent vegetable substances containing tannin, and of all tanning substances, catechus of all kinds, dividivis, and generally of all substances which produce red and other objectionable highly-colored aqueous solutions of tanning; and the object of my invention is to chemically modify the red coloring matter or dye therein, to preserve the tannin from oxidation and loss by fermentation or souring, to check precipitation in the leached solution, and prevent the same in the manufactured extract, whereby these juices are made suitable for tanning leather of a good oak color, and of superior tannage and keeping properties.

The infusions of nearly all tanning substances contain when first made, or after exposure to the air, a dark-red or reddish-brown coloring matter, which becomes permanently attached to and discolors the leather throughout its entire thickness. When exposed to the air, and particularly at high temperatures, the aqueous solution of tannin is subjected to a fermentative decomposition, and converted into gallic acid, which will not be absorbed by the hides or skins.

I have by extensive experiments ascertained that by the incorporation of the chemically-combined form of sulphites, bisulphites, and double sulphites of the bases sodium, calcium, potassium, aluminium, and ammonium, the coloring and extractive matters are destroyed without loss of the tanning quality.

I incorporate these sulphites as double sulphites of an alkali and alkaline earth, as mordants, during the leaching of the bark and other substances, by the ordinary method, or by adding them in the form of solid salt or solution to the ooze or liquor after being leached, in the proportion of a chemical equivalent of the salt to each degree on the barkometer of the weak ooze or liquor to be produced, and I adjust the proportion of the chemicals to the varying strength of the ooze or liquor during the process of concentration, which ooze or liquor may afterward be evaporated to a semi-liquid form in a vacuum-pan, or by other suitable methods of making the concentrated extracts.

These chemical sulphites, in chemically atomic proportion, may be applied to concentrated tanning extracts for the purpose of destroying the coloring matter while it is in a heated condition, after being discharged from the vacuum-pan or vessel in which it has been prepared.

By the application of these chemical sulphites in a chemically atomic proportion tanning ooze or liquor may be prepared from all tanning substances containing the objectionable red coloring matter, to tan hides and skins a good oak color, plump them, give weight, and remove the unneutralized lime remaining in the hides after liming.

The tanning ooze or liquor treated, as herein set forth, by these chemical sulphites may also be put up in casks or packages for transportation, thus enabling tanners to receive a supply of ooze or tanning liquor from locations where it can be produced at a low cost.

I introduce the sulphites, as described, in the proportion of about one ounce in the dry state, and a half pint in the liquid state, to the gallon of ooze.

I do not claim bleaching the extract of hemlock-bark by bringing the ooze or liquor of the bark into intimate contact with sulphurous acid, as described in patent to E. Bradley, dated February 29, 1876, No. 174,110.

What I claim as my invention, and desire to secure by Letters Patent, is—

The process for bleaching tanning juices and preventing their souring, which consists in the incorporation with tannin juices aqueous solutions of tannin and concentrated tanning extracts obtained from hemlock or other bark of the chemically combined form of sulphites of the bases sodium, calcium, potassium, aluminium, and ammonium, separately or combined, either in the form of solid salt or solution, as and for the purposes herein set forth.

In testimony that I claim the foregoing as my own I affix my signature in presence of two witnesses.

JAMES FOLEY.

Witnesses:
  WILLIAM P. BROWN,
  JOHN M. CAMPBELL.